Figure 1:
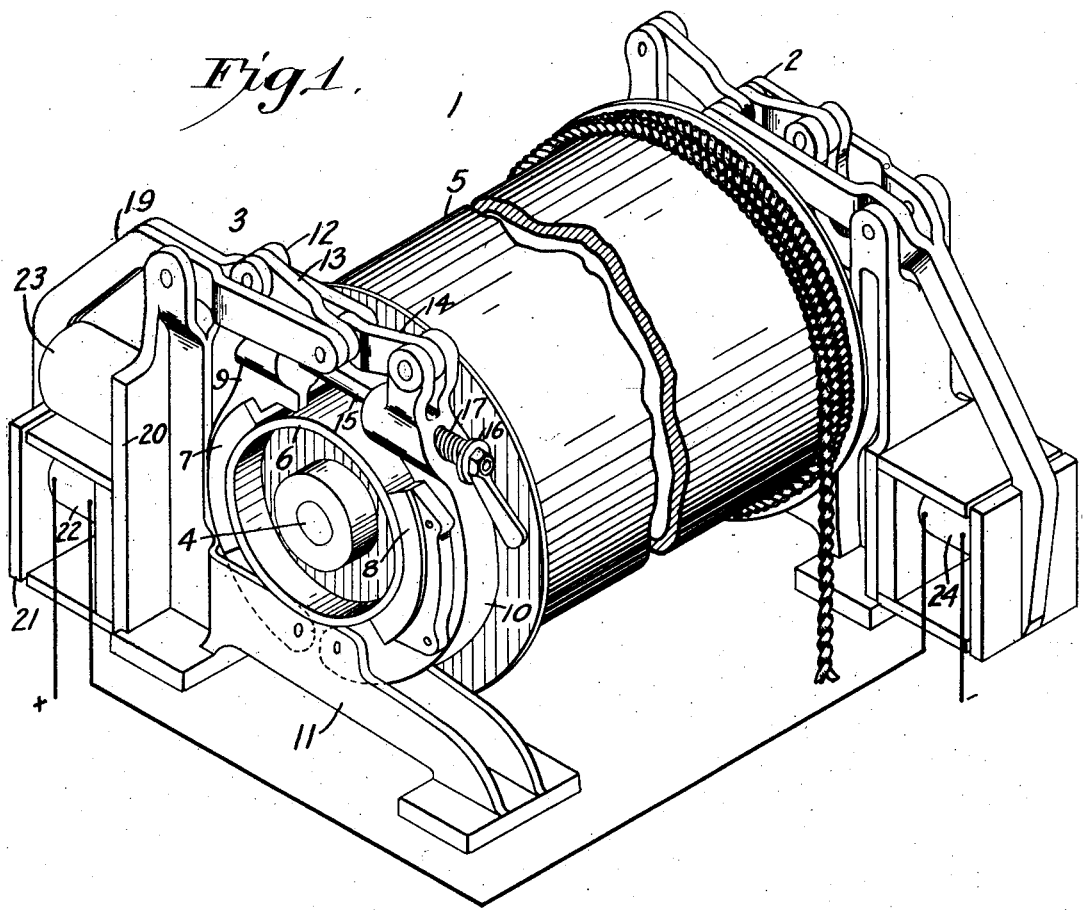

H. D. JAMES.
BRAKE MECHANISM.
APPLICATION FILED DEC. 8, 1917.

1,330,590.

Patented Feb. 10, 1920.

WITNESSES:
Fred. C. Wilharm
W. B. Wells.

INVENTOR
Henry D. James
BY
Wesley G. Carr
ATTORNEY

UNITED STATES PATENT OFFICE.

HENRY D. JAMES, OF EDGEWOOD PARK, PENNSYLVANIA, ASSIGNOR TO WESTINGHOUSE ELECTRIC & MANUFACTURING COMPANY, A CORPORATION OF PENNSYLVANIA.

BRAKE MECHANISM.

1,330,590.          Specification of Letters Patent.     Patented Feb. 10, 1920.

Application filed December 8, 1917. Serial No. 206,160.

*To all whom it may concern:*

Be it known that I, HENRY D. JAMES, a citizen of the United States, and a resident of Edgewood Park, in the county of Allegheny and State of Pennsylvania, have invented a new and useful Improvement in Brake Mechanisms, of which the following is a specification.

My invention relates to brake mechanisms and particularly to brake mechanisms for cranes and for hoisting apparatus.

One object of my invention is to provide a brake mechanism of the above-indicated character for a hoisting apparatus that shall be provided with two brakes, the initial operation of the two brakes being effected simultaneously and the effective operation of one of the brakes being delayed a predetermined time in order to prevent the simultaneous effective operation of the two brakes.

In hoisting apparatus, such as large cranes, it is customary to provide the apparatus with two duplicate brakes in order to insure the safe operation of the apparatus in case of failure of one of the brakes. One of the brakes is associated with the armature shaft and the second brake is generally associated with one of the intermediate shafts which is geared to the motor shaft. The two brakes are generally electrically operated and are controlled by one series circuit in such manner that the two brakes become effective at substantially the same time. However, when the two brakes are operated at the same time, there is danger of the linings of the two brakes becoming worn equal amounts so that the two brakes fail or become inoperative simultaneously. Moreover, unless there is careful inspection of the brakes at regular intervals, there is danger of one of the brakes becoming inoperative for a period of time without the operator of the crane becoming aware of such fact, so that a failure of the remaining brake will cause an accident.

In a brake mechanism constructed in accordance with my invention, two brakes are provided, one of which does not become effective until an appreciable time after the first brake has been operated. Thus, the first brake will perform the greater part of the braking of the crane in order that the second brake may be maintained in good condition for any emergency which may arise by reason of failure of the first brake. Moreover, by having the brakes become effective at different times, it is distinctly called to the operator's attention whenever the first brake fails to operate, so that the same may be repaired and put in good condition at once.

As has been set forth, it is customary to have the two brakes mounted on separate shafts but, for simplicity in illustrating my invention, the two brakes are shown on one shaft, namely, the shaft which supports the winding drum.

Figure 2:
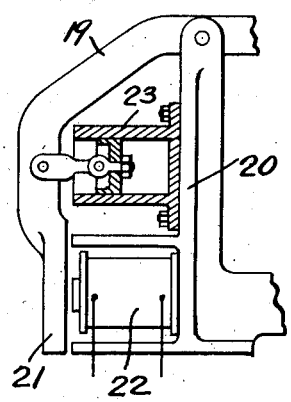

In the accompanying drawings Figure 1 is a perspective view of a brake mechanism constructed in accordance with my invention, and Fig. 2 is a fragmentary view, showing the dash pot in section.

Referring to the accompanying drawing, a brake mechanism 1 embodies a main brake 2 and an auxiliary brake 3. The two brakes 2 and 3 are mounted upon a shaft 4 which supports a winding drum 5 for a crane or for any similar hoisting apparatus.

The two brakes 2 and 3 are similar in construction with the exception that the brake 3 is provided with a device for delaying the effective operation thereof, and accordingly, only one brake, namely, the brake 3 will be described in detail.

The brake 3 embodies a disk 6, which is rigidly mounted on the shaft 4, two brake shoes 7 and 8, which are adapted to engage the disk 6, and two arms 9 and 10, which are pivotally mounted upon a support 11 and are operated by a toggle mechanism 12 that controls the action of the brake shoes 7 and 8.

The toggle mechanism 12 embodies two levers 13 and 14 which are pivotally connected together near one of the ends of each of the levers. The levers are also pivotally connected to the arms 9 and 10, near the opposite ends thereof. The levers 13 and 14 are of such length that, when the same are held in alinement with each other, the two shoes 7 and 8 are held free from the brake disk 6. A rod 15, which passes through the arms 9 and 10, is provided with bolts or enlarged heads near the respective ends thereof and, between the enlarged heads and the arms 9 and 10, are disposed coiled springs 17 which tend to maintain the brake shoes 7 and 8 in engagement with the disk 6. A lever 19, which is pivoted to an upright support 20 intermediate the ends thereof, is provided with an armature 21 which coöperates with the electromagnet 22 near one end thereof. The lever 19 is also pivotally connected to the links 13 and 14, near the end opposite to the end having the armature 21 connected thereto. A dash-pot 23 of any suitable structure is mounted upon the upright 20 and is adapted to delay the retraction of the bell-crank lever 19 whenever the armature 21 thereof is released by the electromagnet 22.

The brake 2 is provided with an electromagnet 24 which is similar in construction to the electromagnet 22 of the brake 3 but the brake 2 is not provided with a dash-pot similar to the dash-pot 23 for delaying the retraction of the bell-crank lever when the same is released by the electromagnet.

In the brakes illustrated in the drawing, the brake shoes are held in engagement with the brake disk by the springs 17 and are released by means of the electromagnets 22 and 24.

Assuming the two brakes to be in the positions illustrated, the same may be released by energizing the two electromagnets 22 and 24. When the electromagnet 22 is operated, the bell-crank lever 19 is given a rotative movement for moving the two levers 13 and 14 into alinement with each other to separate the brake shoes 7 and 8 from the brake disk 6. The brake 2 is released, in a similar manner, by means of the electromagnet 24. The dash-pot 23 does not interfere with the movement of the bell-crank lever 19 when the same is operated by the electromagnet 22, and, accordingly, the two brakes 2 and 3 are released simultaneously. In case it is desired to set the two brakes 2 and 3, the series circuit for the electromagnets 22 and 24 is broken for permitting the two bell-crank levers which are associated with the electromagnets 22 and 24 to be retracted. When the bell-crank lever 19 is moved to the retracted position, the toggles 12 are disposed in a manner to permit the springs 17 to set the brake. The brake 2 is set instantaneously but the operation of the brake 3 is delayed somewhat by means of the dash-pot 23 which is connected to the bell-crank lever 19 in a manner to prevent the rapid retraction thereof.

From the above description, it will be noted that the two brakes 2 and 3 are released simultaneously, whereas, the setting of the brake 3 is delayed somewhat after that of the brake 2 by means of the dash-pot 23.

Modifications in the apparatus and arrangement and location of parts may be made within the spirit and scope of my invention, and such modifications are intended to be covered by the appended claims.

I claim as my invention:

1. In a brake mechanism the combination with a load and a rotatable member operated thereby, of means comprising two brakes for governing the rotation of said rotatable member, means for initiating the operation of said brakes, and means associated with one of said brakes for retarding the operation thereof.

2. In a brake mechanism, two braking devices for governing the lowering of a load, means for initiating the operation of said braking devices, and means for automatically retarding the action of one of said braking devices.

3. In a hoisting mechanism, the combination with two braking devices for jointly governing the lowering of a load carried by the hoisting mechanism, of means for initiating the operation of said braking devices, and means associated with one of said brakes for delaying the effective operation thereof.

4. In a hoisting mechanism, the combination with two braking devices for governing the lowering of the load carried by the hoisting mechanism, of electrical means for initiating the operation of said braking devices, and means associated with one of said braking devices for retarding the operation thereof.

5. In a hoisting mechanism, two braking devices for governing the lowering of a single load, a single series electric circuit for governing the operation of the two braking devices, and means associated with one of said devices for retarding the operation thereof.

6. In an electrically operated hoisting mechanism, a winding drum, two electrically operated brakes associated with said drum, and means associated with one of said brakes for delaying the operation thereof.

7. In a hoisting mechanism, a winding drum, two braking devices for operating on said drum, two electromagnets inserted in the same series circuit for operating said braking devices, and a dash-pot associated with one of said devices for delaying the operation thereof.

8. In a brake mechanism, two electrically operated brakes for operation upon a single load and means, comprising a dash-pot associated with one of said brakes, for delaying the operation thereof.

9. In a brake mechanism, two brakes for operating upon the same load, two electromagnets disposed in the same series circuit for controlling the operation of said brakes, and means associated with one of said brakes for delaying the operation thereof.

10. In a brake mechanism, a winding drum having two brakes associated therewith, electrically operated means for initiating the operation of said brakes, and means independent of said electrically operated means for delaying the operation of one of said brakes.

11. In a brake mechanism, a winding drum having two brakes associated therewith, electrically operated means for simultaneously initiating the operation of said brakes, and means associated with one of said brakes for delaying the effective operation thereof.

12. In a brake mechanism, a winding drum having two brakes associated therewith, means for simultaneously initiating the operation of said brakes, and a dash-pot associated with one of said brakes for delaying the effective operation thereof.

13. In a brake mechanism, two brakes operating upon the same load, means for simultaneously effecting the operation of said brakes, and means associated with one of said brakes for delaying the effective operation thereof.

In testimony whereof, I have hereunto subscribed my name this 30th day of Nov. 1917.

HENRY D. JAMES.